(12) United States Patent
Spencer (10) Patent No.: US 9,195,477 B1
(45) Date of Patent: Nov. 24, 2015

(54) DEVICE PROFILES, DEEP LINKING, AND BROWSER HISTORY SUPPORT FOR WEB APPLICATIONS

(71) Applicant: Sencha, Inc., Redwood City, CA (US)

(72) Inventor: Ed Spencer, Palo Alto, CA (US)

(73) Assignee: Sencha, Inc., Redwood City, CA (US)

( * ) Notice: Subject to any disclaimer, the term of this patent is extended or adjusted under 35 U.S.C. 154(b) by 307 days.

(21) Appl. No.: 13/648,104

(22) Filed: Oct. 9, 2012

(51) Int. Cl.
*G06F 9/44* (2006.01)
*H04L 12/741* (2013.01)

(52) U.S. Cl.
CPC ............... *G06F 9/4443* (2013.01); *G06F 8/38* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 6,996,800 B2* | 2/2006 | Lucassen et al. | 717/106 |
| 2003/0225829 A1* | 12/2003 | Pena et al. | 709/203 |
| 2007/0204117 A1* | 8/2007 | Van Riel et al. | 711/159 |
| 2008/0281983 A1* | 11/2008 | Cooley et al. | 709/245 |
| 2009/0083643 A1* | 3/2009 | Beringer | 715/762 |
| 2011/0113353 A1* | 5/2011 | Koh et al. | 715/760 |
| 2013/0152107 A1* | 6/2013 | Ickman et al. | 719/320 |
| 2013/0173684 A1* | 7/2013 | Kuchhal | 709/201 |

* cited by examiner

*Primary Examiner* — Nicholas Taylor
*Assistant Examiner* — Clayton R Williams
(74) *Attorney, Agent, or Firm* — Hickman Palermo Becker Bingham LLP; Adam C. Stone (57) ABSTRACT

The disclosure relates generally to systems and methods for Web applications developed using a client-side scripting language such as ECMAScript®, JavaScript®, ActionScript®, Jscript®, or the like and, more particularly, to a system with a methodology for more easily customizing the functionality of such Web applications for different types of computing devices and a methodology for deep linking and browser history support for such Web applications.

14 Claims, 6 Drawing Sheets

DEVICE PROFILES, DEEP LINKING, AND BROWSER HISTORY SUPPORT FOR WEB APPLICATIONS

COPYRIGHT STATEMENT

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates generally to systems and methods for Web applications developed using a client-side scripting language such as ECMAScript®, JavaScript®, ActionScript®, Jscript®, or the like and, more particularly, to a system with a methodology for more easily customizing the functionality of such Web applications for different types of computing devices and a methodology for deep linking and browser history support for such Web applications.

BACKGROUND

The first Web applications were largely server-based with no user interface functionality implemented by client-side scripting. Transitions between user interface states were mainly accomplished with a request and response round-trip over a network between a client device and a server device. A Web browser executing on the client device would send to the server device a Hypertext Transfer Protocol (HTTP) request specifying a Web address (e.g., a URL) that identified the next user interface state (e.g., a new Web page). In response, the server device would send back to the client device a HTTP response including Hypertext Markup Language (HTML) content of the requested user interface state. The Web browser would then update a user interface (e.g., a Web page window) displayed at the client computing device based on the HTML content. Over time, client-side scripting languages, such as ECMAScript®, JavaScript®, ActionScript®, Jscript®, and others, were developed. With these client-side scripting languages, a Web application could be developed that transitioned between user interface states without the request and response round-trip between client and server.

Device Profiles

With the first Web applications, minimizing the number of client-scripting language instructions needed to implement the user interface of a Web application was a relatively simple task because client devices were relatively homogenous. With the emergence of smart phones and tablet computing devices, Web applications are now expected to properly function on heterogeneous client devices with different screen sizes (e.g., 3.5-inch diagonal screen size on some mobile phones vs. 21-inch diagonal screen size on some desktop displays) and different user input mechanisms (e.g., mouse/keyboard input vs. touch screen input). Moreover, proper functioning of a Web application is dependent on user expectations which may vary depending on the characteristics of the device being used. For example, a user may expect one kind of user interface of a Web application on a mobile phone with a touch screen (e.g., large touchable user interface elements, no pop-up windows or overlays, and simple input forms) and another different kind of user interface of the Web application on a desktop or laptop computer with a mouse and keyboard (e.g., clickable user interface elements, pop-up windows or overlays, and more complicated input forms). Consequently, user expectations of Web applications in today's world of heterogeneous personal computing devices often cannot be met with a single user interface design and functionality. Instead, users expect a Web application to present a user interface with functionality appropriate for the device being used.

As more and more Web applications are expected to have different user interfaces and functionality on different types of personal computing devices, a whole new set of challenges face developers of Web applications. A particular set of challenges involves reducing the number of client-side scripting language instructions that need to be authored and maintained to implement the different user interfaces and functionality for the different types of devices.

The software industry, in response, has applied a number of software design strategies to make software development and maintenance tasks easier. Once such strategy is known in the industry as Model-View-Controller (MVC). Under a typical MVC strategy, the software instructions implementing the model, the view, and the controller are developed and maintained separately. Generally, the view implements the look and feel of a user interface. The controller implements user interface event handling and user interface state transitions. And the model implements programmatic interfaces for creating, reading, updating, and deleting underlying user data. A theoretical benefit of the MVC strategy is that the implementation of one of the model, view, or controller can be changed without requiring changes to the other two. For example, the look and feel of the user interface can be changed without having to change how user interface events are handled or how the underlying user data is modeled.

However, the typical MVC strategy does not fully solve the problem of reducing the number of software instructions needed to implement a Web application that is to provide different user interfaces and functionality on different types of computing devices. The typical MVC strategy would require the development of a separate Web application for each different type of computing device. The separate Web applications would have different views and possibly different controllers and models for the different types of computing devices. Unfortunately, many software instructions may be duplicated between the separate Web applications. This is undesirable from a software development and maintenance standpoint because it creates more work for the developer and increases the probability of introducing defects (i.e., "software bugs"). For these reasons, the typical MVC strategy does not provide adequate reduction in the number of software instructions.

A development solution is required that allows Web application developers to more easily develop a Web application that provides different user interfaces and associated functionality on different types of computing devices. The solution should not only address the problem of multiple Web applications for the different types of computing devices, but should also provide a solution to the more general problem of reducing the number of software instructions needed to implement a Web application that is to provide different user interfaces and functionality on different types of computing devices.

Deep Linking and Browser History Support

In the case of the first Web applications, a user could navigate directly to a user interface state of a Web application by entering the Web address (e.g., a URL) in the address bar of the Web browser. For example, the initial user interface state of a Web application may correspond to the home page of a shopping Web site. A second user interface state may correspond to a Web page listing products available for purchase hyperlinked from the home page. With the first Web applications, a user could directly navigate to the product listing Web page as if the user had navigated to it from the home page simply by entering the Web address of the product listing Web page in the address bar of the user's Web browser. The user interface states of the first Web applications could also be bookmarked using the Web browser's bookmarking feature.

This type of Web address that links directly to a user interface state is referred to in the industry as a "deep link". The act of providing a deep link to a Web browser to navigate directly to a user interface state bypassing any initial and intermediary user interface states of a Web application is referred to in the industry as "deep linking". Deep linking has at least two benefits to users. First, a deep link can be recorded (e.g., in the form of a bookmark) allowing a user to return to a specific user interface state of a Web application without having to navigate from an initial user interface state to the specific user interface state. Further, a deep link can be shared among users (e.g., in an e-mail message) allowing recipients of the deep link to directly navigate to a specific user interface state without having to understand how to navigate from an initial user interface state to the specific user interface state.

Further, deep linking is related to the browsing history functionality of Web browsers. Generally, a user interface state for which there is a corresponding deep link can be recorded by a Web browser in a browsing history. Consequently, a user can navigate directly to a previously visited user interface state that is recorded as a deep link in the browsing history. For example, the user may invoke the Web browser's back button to return to the previously visited web page.

Today, many Web applications developed using a client-side scripting language such as JavaScript®, ActionScript®, and Jscript® can be used to present user interface states for which there are no corresponding deep links. Consequently, a user cannot navigate directly to these user interface states by entering a Web address in the address bar of a Web browser or otherwise providing a Web address to the Web browser (e.g., by invoking bookmark or invoking the web browser's back button). Instead, the user is required to navigate directly to an initial user interface state (e.g., a home page) and then navigate state by state (e.g., by clicking on hyperlinks or interacting with user interface elements) from the initial user interface state to the target user interface state. This is cumbersome for the user and decreases the overall usability of the Web application. Further, the target user interface state cannot be shared with other users in the form of a deep link.

A deep linking solution is required that allows Web application developers to more easily develop a Web application that presents user interface states using a client-side scripting language to which a user can directly navigate using deep links. The present invention provides a solution for this and other needs.

GLOSSARY

ActionScript®: ActionScript® is an object-oriented programming language developed by Macromedia, Inc. Current versions of ActionScript® (e.g., ActionScript® 3.0) are based on ECMAScript®. ActionScript® is widely-used for the development of Web applications targeting the Abode® Flash® Platform. Additional information on ActionScript® is available from Adobe, currently via the Internet at /devnet/ actionscript.html in the abode.com domain.

DOM: Short for Document Object Model, the specification for how objects in a Web page (text, images, headers, links, etc.) are represented by a Web browser. The DOM defines what attributes are associated with each object, and how the objects and attributes can be manipulated.

ECMAScript®: ECMAScript® is the scripting language standardized by the European Computer Manufacturers Association (ECMA). ECMAScript® is widely used for client-side scripting on the Web, in the form of several well-known dialects such as JavaScript®, Jscript®, and ActionScript®. Further description of ECMAScript® is available in Standard ECMA-262 5.1 Edition/June 2011, the disclosure of which is hereby incorporated by reference. This document is available from the ECMA, and is currently available via the Internet at /ecma-262/5.1/ in the ecma-international.org domain.

HTML: HTML stands for HyperText Markup Language. HTML is a markup language for displaying web pages and other information in a web browser. Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML and SGML specifications. Further description of HTML is available in HTML5: A vocabulary and associated APIs for HTML and XHTML, W3C Working Draft 29 Mar. 2012, the disclosure of which is hereby incorporated by reference. This document is available from the World Wide Web Consortium (W3), and is currently available via the Internet at /TR/htm15/ in the w3.org domain.

HTTP: HTTP is the acronym for "HyperText Transfer Protocol", which is the underlying communication protocol used by the World Wide Web on the Internet. HTTP defines how messages are formatted and transmitted, and what actions Web servers and browsers should take in response to various commands. Further description of HTTP is available in RFC 2616: Hypertext Transfer Protocol—HTTP/1.1, the disclosure of which is hereby incorporated by reference. RFC 2616 is available from the W3, and is currently available via the Internet at /Protocols/ in the w3.org domain. In this description, the term HTTP is meant to include, but not require, all cryptographically secured variants such as the Secure-Hyper-Text Transfer Protocol (HTTPS).

JavaScript®: JavaScript® was designed by Netscape® as a small, lightweight, easy-to-use object-oriented scripting language that is designed to be embedded in other products and applications, such as Web browsers. Inside a host environment, JavaScript can be connected to the objects of its environment to provide programmatic control over such objects. JavaScript instructions can be added to standard HTML pages to create interactive documents and has found considerable use in the creation of interactive Web-based forms. Most modern browsers contain JavaScript® support. Current versions of JavaScript® (e.g., JavaScript® version 1.8.5) are based on ECMAScript®. Additional information on JavaScript® is available from the Mozilla Developer Network, currently via the Internet at /en/JavaScript/ in the developer-.mozilla.org domain.

Jscript®: Jscript® is Microsoft®'s implementation of the ECAMScript® standard used in Microsoft®'s Internet Explorer® Web browser for client-side scripting. Additional information on JScript® is available from Microsoft, currently via the Internet at /en-us/library/hbxc2t98(VS. 85).aspx in the msdn.microsoft.com domain.

URL: Short for Uniform Resource Locator, is a type of Uniform Resource Identifier (URI) that identifies a resource such as a web page on a network such as the Internet. URLs can be absolute or relative. An absolute URL contains a scheme and a scheme-specific part. A relative URL is based on a hierarchical structure of an absolute URL on which the relative URL is based. Further description of URLs is available in RFC 1738: Uniform Resource Locators, the disclosure of which is hereby incorporated by reference. RFC 1738 is available from the Internet Engineering Task Force (IETF), and is currently available via the Internet at /html/rfc1738 in the tools.ietf.org domain. In this description, the term URL is meant to include absolute URLs and relative URLs as well as any fragment identifier portion thereof. Further description of fragment identifiers is available in RFC 3986: Uniform Resource Identifier (URI): Generic Syntax, the disclosure of which is hereby incorporated by reference. RFC 3986 is available from the IETF, and is currently available via the Internet at /html/rfc3986 in the tools.ietf.org domain.

XHTML: Short for Extensible Hypertext Markup Language, a hybrid between HTML and XML. XHTML is a family of current and future document types and modules that reproduce, subset, and extend HTML. XHTML family document types are XML based, and ultimately are designed to work in conjunction with XML-based user agents. Further description of XHTML is available in HTML5: A vocabulary and associated APIs for HTML and XHTML, W3C Working Draft 29 Mar. 2012, the disclosure of which is hereby incorporated by reference. This document is available from the World Wide Web Consortium (W3), and is currently available via the Internet at /TR/htm15/ in the w3.org domain.

SUMMARY OF EMBODIMENTS

The present invention according to some embodiments takes advantage of the fact that computing programming language instructions written in a client-side scripting language can be executed to detect the type of computing device on which the software instructions are executing. Such instructions can be invoked to determine which "model" software components ("models), "view" software components ("views"), and "controller" software components ("components") of a Model-View-Controller (MVC)-architected Web application should be loaded for execution by the type of computing device that is detected. In this way, a single Web application can provide different user experiences for the different types of computing devices on which the Web application executes.

The system in which the present invention according to some embodiments is embodied includes a device profile loader software module ("device profile loader") that serves a Web application execution-time loading function for developer-authored device profile software components ("device profiles") of a Web application. Each developer-authored device profile specifies one or more models, one or more controllers, or one or more views that are part of that device profile. The device profile loader determines which of the device profiles should be the active one for the "target" computing device on which the Web application is executing. Once the active device profile is determined, the device profile loader loads the models, the views, and the controllers specified by the active device profile. In this way, a developer can author a single Web application with multiple device profiles and the appropriate models, views, and controllers are loaded at execution-time depending on the characteristics of the target computing device.

The present invention according to some embodiments involves the delegation of determining whether a given device profile should be the active one to the device profile itself. Each device profile of a Web application is queried by the device profile loader in turn until a device profile indicates that it should be the active device profile on the target computing device. All models, views, and controllers specified by the Web application as common to all types of devices are loaded by the device profile loader. In addition, all models, views, and controllers specified by the active device profile are also loaded by the device profile loader. With the device profile loader of the present invention, different combinations of models, views, and controllers are loaded at execution-time depending on the characteristics of the target computing device. Authoring separate Web applications for different types of computing devices is not necessary.

The system in which the present invention according to some embodiments is embodied also includes a Web application launcher software module ("Web application launcher") that serves a runtime initialization and launching function for the models, views, and controllers of the Web application loaded by the device profile loader. The Web application launcher implements a 3-stage Web application launch process. First, all loaded controllers are initialized. Second, the active device profile is launched. Third, an application component is launched. The three stage launch process implemented by the Web application launcher allows the Web application to provide an initial user interface for the Web application that is different depending on the characteristics of the target computing device. For example, the initial user interface of a Web application on a mobile phone may be an advertisement or splash screen that occupies the available display screen area. In contrast, the initial user interface on a desktop computer may include multiple user interface windows presented simultaneously.

According to some embodiments of the present invention, a deep link for a specific user interface state of a Web application implemented in a client-side scripting language is created using a deep link router software module ("deep link router"). Controllers of the Web application specify which "routes" the controller is interested in receiving notification of from the deep linker router. Generally, a route is a mapping defined by the controller between a URL or a set of URLs and a method of that controller. The deep link router is configured to receive notification of DOM events from the web browser corresponding to when the web browser is commanded to load a web page at a given URL. For example, the DOM events may correspond to when a user enters a URL into the address bar of the web browser or invokes the back button functionality of the web browser. Upon receiving such a DOM event, the deep link router consults a callback table of registered routes to determine with method on which controller, if any, should be invoked. The invoked controller method may execute logic (e.g., update view(s)) to place the Web application in the specific user interface state. In this way, a deep link for the specific user interface state may be created.

In this summary and in the detailed description that follows, logic components and modules are described as being implemented in software. While these components and modules are implemented in software in the currently-preferred embodiment, it should be understood that these components and modules can be implemented entirely in hardware or in a combination of software and hardware according to the requirements of the implementation at hand.

DETAILED DESCRIPTION OF EMBODIMENT(S)

The following description will focus on a presently-preferred embodiment of the present invention, which is implemented in a Web application operating in an Internet-connected environment running under a desktop, mobile, or tablet Web browser, such as Internet Explorer®, Google Chrome®, Firefox®, Safari®, Opera®, Android®, or other Web browser, running on a desktop, mobile, or tablet operating system, such as Microsoft Windows®, Google Chrome® OS, Linux®, Mac OS® X, Unix®, or other operating system, running on a computing device, such as a desktop computer, a laptop computer, a mobile phone, a smart phone, a tablet computing device, or other computing device. The present invention, however, is not limited to any particular one application or any particular environment. Instead, those skilled in the art will find that the system and methods of the present invention may be advantageously embodied on a variety of different platforms. Therefore, the description of the exemplary embodiments that follows is for purposes of illustration and not limitation.

1.0 Basic Hardware and Software Environment 1.1 Sample Computing Device

Figure 1:
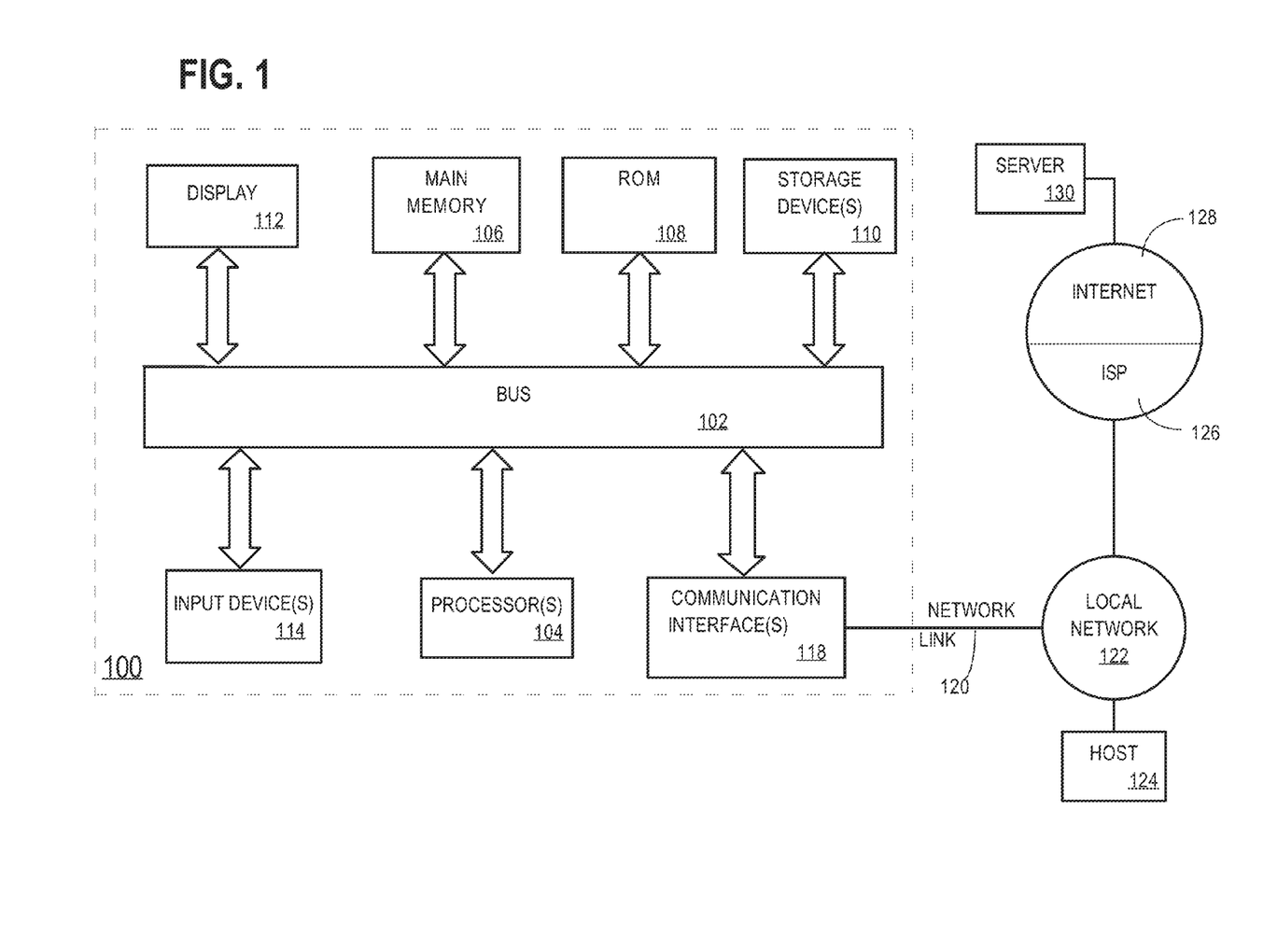
FIG. 1 is a block diagram of a computing device in which software-implemented processes of the present invention may be embodied.

FIG. 1 is a block diagram that illustrates a computing device 100 upon which the present invention may be implemented. Computing device 100 includes a bus 102 or other communication mechanism for communicating information, and one or more hardware processors 104 coupled with bus 102 for processing information. A hardware processor 104 may be, for example, a general purpose microprocessor.

Computing device 100 also includes a main memory 106, such as a random access memory (RAM) or other dynamic storage device, coupled to bus 102 for storing information and instructions to be executed by processor(s) 104. Main memory 106 also may be used for storing temporary variables or other intermediate information during execution of instructions to be executed by processor(s) 104. Such instructions, when stored in non-transitory media accessible to processor(s) 104, render computing device 100 into a special-purpose computing device that is customized to perform the operations specified in the instructions. For purposes of this description, main memory 106 includes any non-volatile memory used to implement virtual memory.

Computing device 100 may further include a read only memory (ROM) 108 or other static storage device coupled to bus 102 for storing static information and instructions for processor(s) 104. One or more storage device(s) 110, such as magnetic disks, optical disks, or solid-state drives, may be provided and coupled to bus 102 for storing information and instructions.

Computing device 100 may be coupled via bus 102 to a display 112, such as a liquid crystal display (LCD), for displaying information to a computer user. One or more input device(s) 114, including alphanumeric and other keys, a touch panel, physical buttons, a mouse, a trackball, a cursor control device, or other input device may be coupled to bus 102 for communicating information and command selections to processor(s) 104. Where an input device 114 is a touch panel, the touch panel may be physically integrated with the display 112, for example as a resistive or capacitive sensing touch panel overlay on an LCD screen, for detecting the presence and location of touch within the display 112 area.

Computing device 100 may implement the techniques described herein using customized hard-wired logic, one or more ASICs or FPGAs, firmware and/or program logic which in combination with the computer system causes or programs computing device 100 to be a special-purpose machine. The techniques herein may be performed by computing device 100 in response to processor(s) 104 executing one or more sequences of one or more instructions contained in main memory 106. Such instructions may be read into main memory 106 from another storage medium, such as storage device(s) 110. Execution of the sequences of instructions contained in main memory 106 causes processor(s) 104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device(s) 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor(s) 104 for execution. For example, the instructions may initially be carried on a magnetic disk or solid-state drive of a remote computer. The remote computer can load the instructions into its dynamic memory and send the instructions over wired (e.g., twisted pair, coaxial cable, optical fiber, etc.) or wireless (e.g., microwave, satellite, cellular, radio, etc.) networks. A network communications device local to computing device 100 can receive the data on the network and use an infra-red transmitter to convert the data to an infra-red signal. An infra-red detector can receive the data carried in the infra-red signal and appropriate circuitry can place the data on bus 102.

Bus 102 carries the data to main memory 106, from which processor(s) 104 retrieves and executes the instructions. The instructions received by main memory 106 may optionally be stored on storage device(s) 110 either before or after execution by processor(s) 104.

Computing device 100 also includes one or more communication interface(s) 118 coupled to bus 102. Communication interface(s) 118 sends and receives electrical, electromagnetic or optical signals that carry digital data streams representing various types of information. Communication interface(s) 118 provides a two-way data communication coupling to a network link 120 that is connected to a wired or wireless local network 122. For example, communication interface(s) 118 may include a modem, an integrated services digital network (ISDN) card, an Ethernet card, a cable modem, a satellite modem, an IEEE 802.11 or other Wireless Local Area Network (WLAN) interface, a 3G, 4G, or other cellular network interface, or other network interface for communicating on wired or wireless local network 122.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computing device 100, are example forms of transmission media.

Computer system 100 can send messages and receive data, including program instructions, through the network(s), network link 120 and communication interface(s) 118. In the Internet example, a server 130 might transmit a requested instructions for an application program through Internet 128, ISP 126, local network 122 and communication interface(s) 118.

The received instructions may be executed by processor(s) 104 as it is received, and/or stored in storage device(s) 110, or other non-volatile storage for later execution.

1.2 Sample Software Environment

Figure 2:
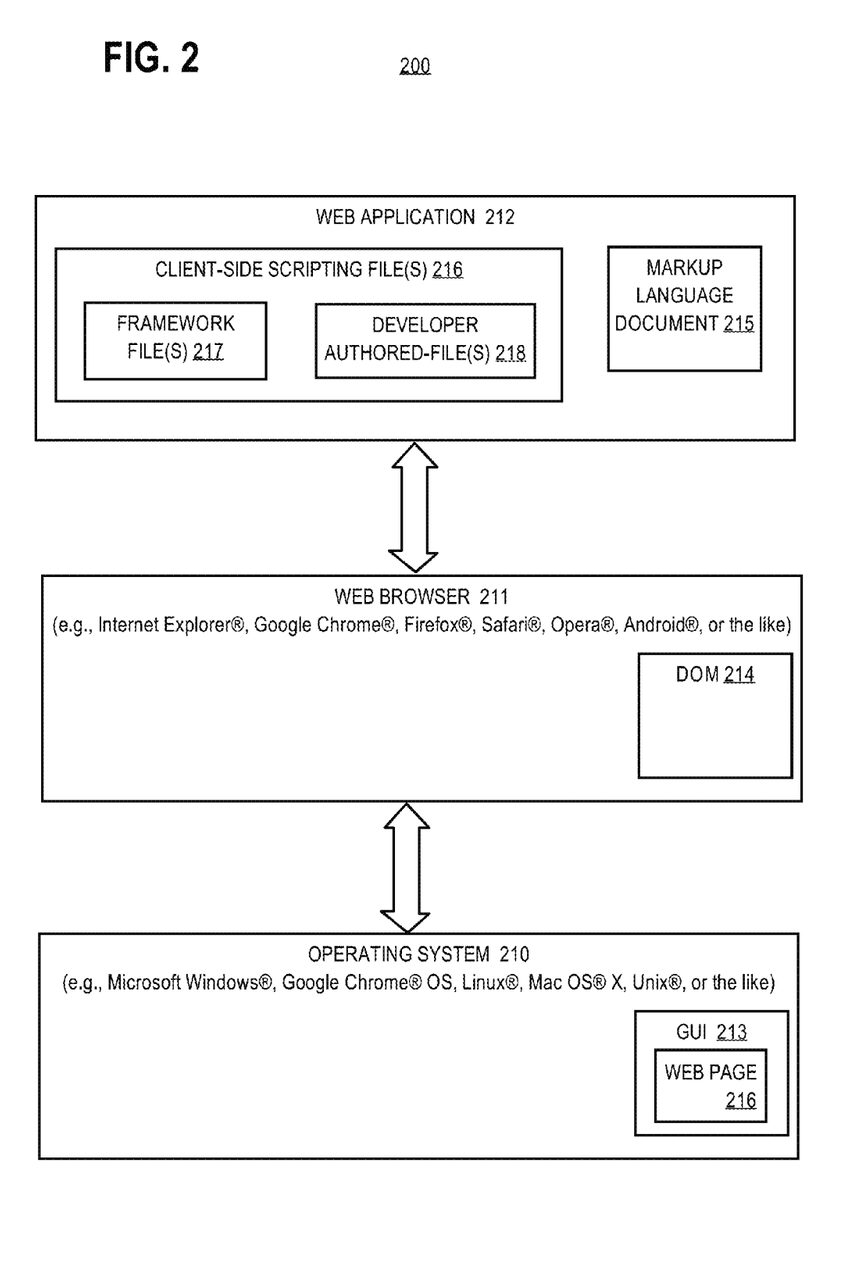
FIG. 2 is a block diagram of a software system for controlling the operation of the computing device.

Illustrated in FIG. 2, a computer software system 200 is provided for directing the operation of the computing device 100. Software system 200, which is stored in main memory 106 and/or on storage device(s) 110, includes an operating system 210. The operating system 210 manages low-level aspects of computing device operation, including managing execution of processes, memory allocation, file input and output (I/O), device, I/O, and network communications. The operating system 210 can be provided by a conventional mobile, tablet, or desktop operating system, such as Microsoft Windows®, Google Chrome® OS, Linux®, Mac OS® X, Unix®, or other operating system.

One or more application programs, such as a Web browser 211, may be transferred from storage device(s) 110 into main memory 106 for execution by the computing device 100. The Web browser 211 can be provided by a conventional mobile, tablet, or desktop Web browsing application, such as Internet Explorer®, Google Chrome®, Firefox®, Safari®, Opera®, Android®, or other Web browser software. Optionally, Web browser 211 may be a component of, or otherwise a part of, the operating system 210

Software system 200 includes a graphical user interface (GUI) 213, for receiving user commands and data in a graphical (e.g., "point-and-click" or "touch") fashion. These inputs, in turn, may be acted upon by the device 100 in accordance with instructions from the operating system 210, the Web browser 211, and/or the Web application 212. The GUI 213 also serves to display the results of operation from the operating system 210, the Web browser 211, and/or the Web application 212.

A Web application 212 may be downloaded by the computing device 100 from a server 130 and stored in storage device(s) 110. The Web application 212 may be transferred from storage device(s) 110 into main memory 106 for execution by the computing device 100. The Web application 212 includes a markup language document 215 (e.g., a HTML, XHTML, or XML document) that represents a web page 216 displayed as part of the GUI 213. The Web browser 211 maintains a Document Object Model (DOM) representation 214 of the web page 216 in main memory 106. The DOM representation 214 provides an application programming interface (API) for dynamically updating content and visual presentation of the web page 216 using a client-side scripting language. The Web application 212 may include other documents such as one or more style sheet documents (e.g., Cascading Style Sheet documents).

After the markup language document 215 is downloaded to device 100, the device 100 executes the instructions of the markup language document 215 to generate an initial web page 216 and corresponding DOM representation 214. Execution of the markup language document 215 instructions may result in execution of instructions of the client-side scripting file(s) 216 by the device 100, for example, as a result of one or more <script> markup language instructions contained in the markup language document 215. Instructions of the client-side scripting file(s) 216, when executed by the device 100, may update content and visual presentation of the web page 216 though the API provided by the DOM representation 214.

Client-side scripting file(s) 216 may be divided into client-side scripting framework file(s) 217 and developer-authored file(s) 218. Framework file(s) 217 may be provided by as part of a client-side Web application framework. One non-limiting example of a commercially-available framework is the Ext JS® JavaScript® framework currently available from Sencha, Inc. of Redwood City, Calif. According to some embodiments, techniques of the present invention described herein are implemented by client-side scripting language instructions contained in framework file(s) 217. The instructions are executed by computing device 100 to carry out the techniques. Developer-authored file(s) 218 contain developer-authored instructions that implement specific Web application functionality. Such instructions may extend, implement, or override more general Web application functionality provided by the framework file(s) 217 through object-oriented or other software programming paradigms. The instructions of client-side scripting file(s) 216, including the instructions of framework file(s) 217 and developer-authored file(s) 218, may be in any number of client-side scripting languages such as an ECMAScript-based language, JavaScript, ActionScript, Jscript, or the like.

The above-described computer hardware and software are presented for purposes of illustrating the basic underlying computer components that may be employed for implementing the present invention. The present invention, however, is not limited to any particular environment or device configuration and may be implemented in any type of system architecture or processing environment capable of supporting the methodologies of the present invention presented in detail below.

2.0 Introduction to Device Profiles, Deep Linking, and Browser History Support

2.1 System Overview

Figure 3:
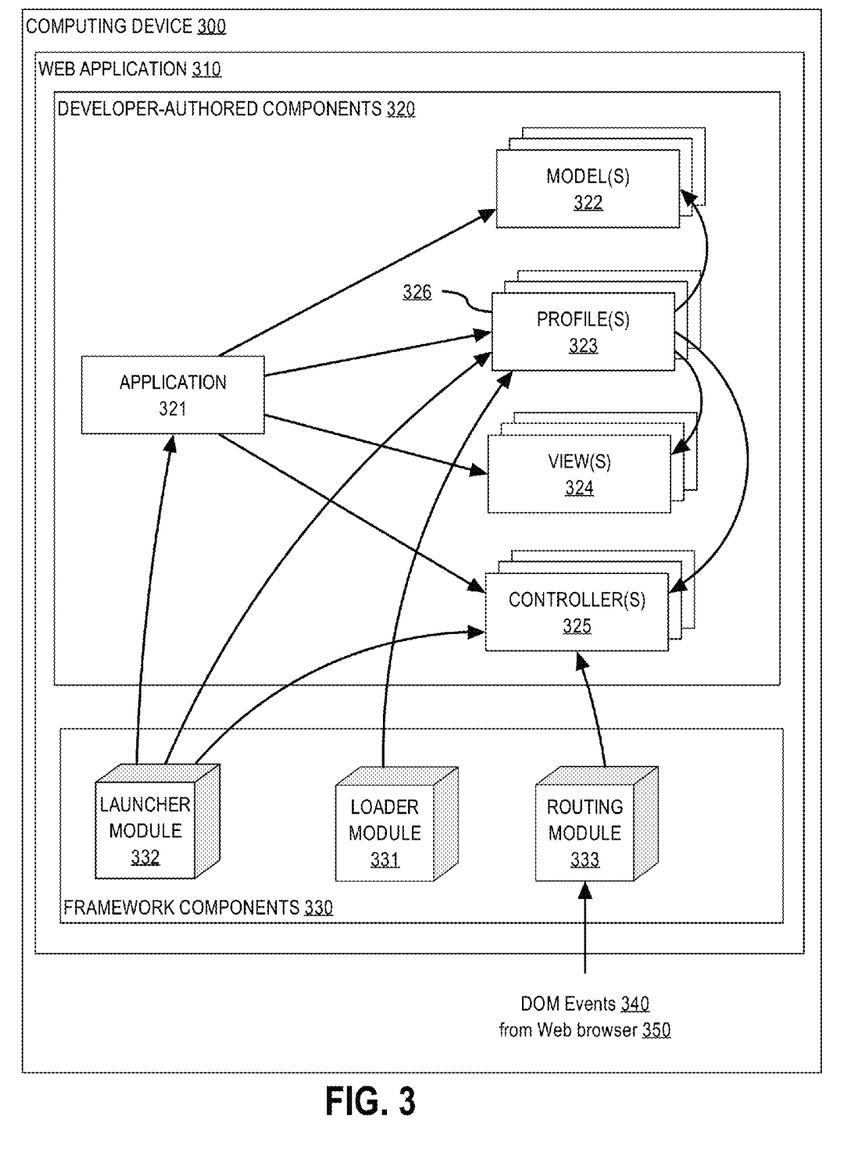
FIG. 3 is a block diagram providing an overview of a Web application system in which the present invention may be embodied.

FIG. 3 shows a block diagram of a target computing device 300, such as a smart phone, a tablet computer, desktop computer, laptop computer, or other type of computing device, that is executing a Web application 310 and a Web browser 350. The Web application 310 includes a collection of components 330 provided as part of a Web application framework designed to support the development of Web applications in a client-side scripting language such as ECMAScript®, JavaScript®, ActionScript®, Jscript®, or the like. Framework components 330 include the device profile loader 331, the Web application launcher 332, and the deep link router 333 of the present invention.

In FIG. 3, the device profile loader 331, the Web application launcher 332, and the deep link router 333 of the present invention are installed and operational on device 300. It should be understood however that all three of the device profile loader 331, the Web application launcher 332, and the deep link router 333 are not required by an implementation of the present invention and a given implementation may have all three installed and operational, just the device profile loader 331 but not the Web application launcher 332 or the deep link router 333, or the device profile loader 331 and the Web application launcher 332 but not the deep link router 333.

The Web application 310 also includes a collection of developer-authored components 320 authored by a developer using the client-side scripting language. The developer-authored components 320 include one or more models 322, one or more device profiles 323, one or more views 324, and one or more controllers 325. Generally, a model 322 represents a type of data object specific to the Web application 310. For example, an e-commerce Web application may have models 322 for Users, Products, and Orders. A view 324 is responsible for displaying data to users of the Web application. In doing so, a view 324 may use, extend and/or implement user-interface components (not pictured) of the framework 330 such as navigation components (e.g., toolbars, buttons, title bars, etc.), form components (panels, checkboxes, slider bars, text boxes, date selectors, etc.), and other components (e.g., panels, images, audio, video, maps, etc.) that implement specific user-interface functionality. A controller 325 handles user interaction events with the Web application 310 (e.g., when a user taps and swipes a touch screen) and other events received by the Web application 310.

An application component 321 has references (e.g., pointers) (indicated with arrows in FIG. 3) to model(s) 322, view(s) 324, and/or controller(s) 325 that will be loaded by the device profile loader 331 on all computing devices on which the Web application 310 executes. In addition, the application component 321 has references or pointers to one or more device profile(s) 323. Each device profile 323 has references to one or more model(s) 322, view(s) 324, and/or controller(s) 325 that will be loaded by the device profile loader 331 if that device profile(3) 323 elects itself as the active device profile 326. Each device profile 323 provides a predetermined interface (e.g., a predetermined method) by which the device profile loader 331 can query that device profile 323 to determine whether that device profile 323 should be the active device profile 326 on the target computing device 300.

2.1.1 Device Profile Loader

In operation, device profiler loader 331 queries a predetermined interface (e.g., a predetermined method) of each of the device profile(s) 323 in turn to determine which of the profile(s) 323 is to be the active profile 326 on the computing device 300 on which the Web application 310 is executing. In this way, determination of which device profile 323 should be the active profile 326 is delegated to the device profile(s) 323 themselves.

In one embodiment, the predetermined interface of a device profile 323 returns a Boolean value (e.g., true or false) in response to the query by the device profile loader 331. True (or equivalent value) is returned to indicate to the device profile loader 331 that the queried device profile 323 should be active device profile 326 on the target computing device 300 (i.e., the device on which the Web application 310 is currently executing). False (or equivalent value) is returned otherwise. In addition to the model(s) 322, view(s) 324, and controller(s) 325 specified by the application 321, the device profile loader 331 loads all additional model(s) 322, view(s) 324, and controller(s) 325 specified by the active device profile 326.

With this query-able interface of the device profile(s) 323, the device profile loader 331, and more generally, the framework 330, can delegate determination of which device profile 323 should be the active device profile 326 on the target computing device 300 to the device profile(s) 323 themselves, and more generally, to the developer of the device profile(s) 323. This delegation is useful from the perspective of both the provider of the framework 330 and the developer of the Web application 310 because the developer of the Web application 310 is likely to have a better grasp on the different types of computing devices 300 on which the Web application 310 will be expected to execute.

2.1.2 Web Application Launcher

The Web application launcher 332 implements a web application launch process that allows the web application 310 to setup and present an initial user interface according to the active device profile 326. This is useful for presenting different initial user interfaces on different types of devices 300. The launch process begins after the device profile loader 331 has finished loading the model(s) 322, view(s) 324, and controller(s) 325 of the application 321 and the active device profile 326.

In one embodiment, the launch process is three steps. In the first step, each controller 325 loaded from the application 321 and each controller 324 loaded from the active device profile 326 is instantiated if necessary and then initialized by the launcher 332. For example, the Web application launcher 332 may instantiate each loaded controller 325 and invoke an initialization method of each loaded and instantiated controller 325. This first step provides the opportunity for each controller 325 to execute logic in preparation for the second step of the launch process.

In the second step, the active device profile 326 is launched by the Web application launcher 332. For example, the Web application launcher 322 may invoke a launch method of the active device profile 326. The second step provides the opportunity for the active device profile 326 to setup and initialize the initial user interface (e.g., the active device profile-specific view(s) 324) of the web application 310. Note that depending on which device profile 323 was loaded by the device profile loader 331 as the active device profile 326, the user interface that is setup and initialized in the second step may vary depending on the type of computing device 300. For example, depending on whether the computing device 300 is a tablet computer or a desktop computer, different user interfaces may be setup and initialized in the second step of the launch process. Further, since the device profile loader 331 handles loading the device profile 323 appropriate for the computing device 300 on which the Web application 310 is executing, the developer of the developer-authored components 320 can avoid "polluting" the client-side scripting language instructions of the developed-authored components 320 with complex and difficult to maintain if/then/else or other branching logic for setting up and initializing different initial user interfaces for different computing devices 300.

In the third step, the Web application launcher 332 launches the application 321 by invoking a launch method of the application 321. In some embodiments, the third step also includes the Web application launcher 322 launching each controller 325 that was instantiated and initialized in the first step of the launch process.

2.1.3 Deep Link Router

In an embodiment, a controller 325 specifies which "routes" the controller is interested in receiving notification of from the deep link router 333. Generally, a route is a mapping specified by a controller 325 between a URL or a set of URLS and a method of that controller 325. In one embodiment, routes specified by controllers 325 loaded by the device profile loader 331 are registered with the deep link router 333 in the first and/or third steps of the launch process carried out by the Web application launcher 332. The deep link router 333 is configured to receive notification of DOM events 340 from the web browser 350 corresponding to when the web browser 350 is commanded to load a web page at a given URL. For example, the DOM events 340 may correspond to when a user enters a URL into the address bar of the web browser 350 or invokes the back button functionality of the web browser 350.

Upon receiving a DOM event 340, the deep link router 333 consults a callback table to determine which loaded controller 325 should be invoked, if any. In particular, the deep link router 333 consults the callback table to determine which method of which loaded controller 325 should be invoked, if any. If no controller 325 is to be invoked according to the callback table then the deep link router 333 does not handle the DOM event 320 so that other components of the framework 330 or the Web browser 350 can handle the DOM event 320. When invoked by the deep link router 333, the controller 325 may execute logic (e.g., update view(s) 324) to place the Web application 310 in a specific user interface state. In this way, a deep link for the specific user interface state is created.

3.0 Detailed Construction of an Embodiment

3.1 Introduction

According to one embodiment of the invention, a developer authors a Web application including one or more models, views, controllers, and device profiles in a client-side scripting language. The Web application is authored according to predetermined programmatic interfaces that the device profile loader, the Web application launcher, and the deep link router of the present invention invoke at Web application execution time to carry out techniques of the present invention.

Examples of these predetermined programmatic interfaces will now be described by examples authored using JavaScript®. These example programmatic interfaces are used by the device profile loader, the Web application launcher, and the deep link router of the Ext JS® JavaScript® framework currently available from Sencha, Inc. of Redwood City, Calif. However, it should be understood that the present invention is not limited to JavaScript® or the Ext JS® JavaScript® framework and other client-side scripting languages and other client-side scripting language Web application development frameworks may be used instead.

3.1. Anatomy of a Developed-Authored Application Component

As explained above, an execution Web application includes an application component and a collection of models, views, controllers, and/or device profiles among other possible components. Development of a Web application may start with development of the application component. A developer can author a definition of an application component as follows, for example:

```
Ext.application({
  name: 'MyApp',
  profiles: ['Phone', 'Tablet'],
  models: ['User', 'Product', 'Order'],
  views: ['OrderList', 'OrderDetail', 'Main'],
  controllers: ['Orders'],
  launch: function( ) {
    Ext.create('MyApp.view.Main');
  }
});
```

In one embodiment, the device profile loader uses the name property of the application to create a single execution-time namespace for the Web application, including all of the models, views, controllers, and the active device profile of the application component and all models, views, and controllers of the active device profile. For example, a Web application named MyApp may have its constituent models, views, and controllers loaded by the device profile loader into the single namespace under the names MyApp.model.User, MyApp.controller.Users, MyApp.view.Main, etc. This keeps the entire Web application under a single namespace thereby minimizing the chance that components that are not part of the Web application conflict at execution-time with components that are part of the Web application. While in this example the property is titled name, other designations are possible and the present invention is not limited to any particular property name.

In one embodiment, the device profile loader uses the defined models, views, and controllers properties of the application component to automatically load the specified models, views, and controllers. Such loading may involve, but need not involve, locating, opening, and reading file system files containing definitions of the specified models, views, and controllers. The definitions are executed as part of the device profile loading process to bring these components into the execution-time namespace of the Web application.

A file system file path convention may be used by the device profile loader for locating the files containing the definitions. For example, model definitions may be expected to be in a model sub-directory of a known Web application directory, controller definitions in a controller sub-directory, and view definitions in a view sub-directory. In this case, the device profile loader may expect to find the definition for the User model at [known Web application directory]/model/User.js and the definition for the Main view at [known Web application directory]/view/Main.js. Other conventions may be used and the present invention is not limited to any particular file pathname convention. Further, property names other than models, views, and controllers may be used.

In the above example, the launch function is a predetermined function invoked by the Web application launcher during the third phase of the launch process. In this example, the launch function creates the view MyApp.view.Main. Other names may be used for the launch function and the present invention is not limited to the name launch.

3.2 Device Profiles

A Web application may execute on a wide range of devices with differing capabilities and screen sizes. A user interface that works well on a tablet device may not work well on a mobile phone device. Consequently, the present invention allows a Web application to provide customized views and associated functionality for different device types while reducing the amount of client-side scripting language instructions the developer must author.

The device profiles are components that enable the developer to define the different types of devices supported by the Web application and how the devices should be handled differently. In one embodiment, each device profile defines a predetermined method that should return true when invoked by the device profile loader if that profile should be the active profile on the target computing device. Each device profile also defines a set of additional models, views, and controllers to be loaded by the device profile loader if that profile is detected.

For example, assume the tablet version of the Web application enables additional capabilities for managing groups. The tablet device profile might then be defined by the developer as:

```
Ext.define('MyApp.profile.Tablet', {
   extend: 'Ext.app.Profile'
   config: {
      controllers: ['Groups'],
      views: ['GroupAdmin'],
      models: ['MyApp.model.Group']
   },
   isActive: function( ) {
      return Ext.os.is.Tablet;
   }
});
```

In this example, the predetermined function that is invoked by the device profile loader to determine whether the device profile should be the active one on the target computing device is named isActive. However, the name isActive or any particular name is not required by the present invention. This example isActive function will return true whenever the Web application is executed on what the Ext JS® JavaScript® framework determines to be a tablet computing device. This is a slightly subjective determination because there is a near-continuous spectrum of device shapes and sizes with no clear cutoff between different types of computing devices (e.g., phones and tablets). The developer can override the framework's determination of what is a tablet computing device by providing different tablet detection logic inside the body of the isActive function.

The developer authors all device profiles of a Web application such that only one of the device profiles returns true from its isActive function on any given target computing device. If more than one of them returns true, the device profile loader loads the first device profile that returns true from its isActive function and ignores the rest of the device profiles. The device profile loader may invoke the isActive functions of the device profiles in the order specified by the profiles property of the application component. The first one that returns true from the isActive function will be set by the device profile loader as the active device profile.

If the detected active device profile has defined additional models, views, and controllers properties these will be automatically loaded by the device profile loader as if they were defined by the application component. However, when compared to the application component, a different file system path convention may be used by the device profile loader to locate the files containing the component definitions of the models, views, and controllers of the active device profile. For example, the convention may be to prepend the shortened profile name to the shortened component name in the path. For example, the device profile loader may attempt to locate the file containing the component definition for the GroupAdmin view at [a Web application directory]/view/tablet/GroupAdmin.js, the component definition for the Groups controller at [a Web application directory]/controller/tablet/Groups.js, and the component definition for the Group model at [a Web application directory]/model/tablet/Group.js. Other conventions may be used and the present invention is not limited to any particular convention.

3.2.1 Setting Up Device Profiles

As discussed above, device profiles exist within the context of an application component. For example, if a developer wanted to create an email Web application with phone and tablet profiles, then the developer might define the application component as follows:

```
Ext.application ({
   name: 'Mail',
   profiles: ['Phone', 'Tablet']
});
```

In this example, the application component does not define a launch function. Therefore, no such function will be invoked by the Web application launcher during the third launch phase.

By convention, the device profile loader may expect to locate the files containing the component definitions for the Phone and Tablet device profiles in a profile sub-directory of a Web application directory as in [a Web application directory]/profile/Phone.js and [a Web application directory]/profile/Tablet.js respectively. Other conventions may be used.

The developer might define the Phone profile as:

```
Ext.define('Mail.profile.Phone', {
   extend: 'Ext.app.Profile',
   config: {
      name: 'Phone',
      views: ['Main']
   },
   isActive: function( ) {
      return Ext.os.is.Phone;
   }
});
```

The Tablet device profile definition may follow a similar pattern. In the Phone device profile, the developer supplied three pieces of information—a name, a set of additional views to load if this device profile is the active one, and the isActive method. As discussed above, the isActive method may be invoked by the device profile loader to determine if the device profile should be the active one on the target computing device. The developer can write logic in the isActive method which returns true from the method if the device profile should be the active one and returns false otherwise.

3.2.2 Determining the Active Device Profile

Once the device profiles specified by the application component have been loaded by the device profile loader, their isActive functions are called in turn by the device profile loader. The first one to return true is the device profile that is designated as the Web application's active device profile. The device profile loader then loads the active device profile's dependencies—the models, views, and/or controllers specified by the active device profile. The device profile loader does this by combining the models, views, and controllers specified by the application component with those specified in the active device profile.

As an example, assume the following application component and the Phone device profile above are defined in a Web application:

```
Ext.application({
name: 'Mail',
profiles: ['Phone', 'Tablet'],
models: ['User'],
views: ['Navigation', 'Login']
});
```

When the Web application is executed on what the Phone device profile detects as a phone computing device, the Phone profile is activated by the device profile loader and the device profile loader may load the following files according to a file pathname convention:

[a Web application directory]/model/User.js
[a Web application directory]/view/Navigation.js
[a Web application directory]/view/Login.js
[a Web application directory]/view/phone/Main.js The first three components are specified in the application component. The fourth component is specified by the Phone device profile. According to one embodiment, components that are specific to a device profile are expected to be defined in a sub-directory with the same name as the device profile. For example, the Main view specified in the Phone device profile may be loaded from [a Web application directory]/view/phone/Main.js, whereas if Main view is specified in the application component it may be loaded from [a Web application directory]/view/Main.js. Other conventions may be used.

3.2.3 Specializing Views

According to some embodiments, the device profile loader of the present invention allows the developer to specialize a generic view for a particular type of target computing while reusing client-side scripting language instructions provided by the generic view in the specialized view. For example, consider a Web application where the following device profile is the active device profile on a target computing device deemed by the isActive method of the device profile to be a tablet computing device:

```
Ext.define('Mail.profile.Tablet', {
extend: 'Ext.app.Profile',
config: {
  views: ['Main']
},
isActive: function( ) {
  return Ext.os.is.Tablet;
},
launch: function( ) {
  Ext.create('Mail.view.tablet.Main');
}
});
```

During the Web application launch process, the Mail.view.tablet.Mail view is created when the Web application invokes the launch method of this device profile. This tablet-specific view might be defined by the developer to extend another developer-defined "generic" view, Mail.view.Main, as:

```
Ext.define('Mail.view.tablet.Main', {
extend: 'Mail.view.Main',
config: {
  title: 'Tablet-specific version'
}
});
```

For example, the Mail.view.Main view might be defined to extend a framework provided component, Ext.Panel, as:

```
Ext.define('Mail.view.Main', {
extend: 'Ext.Panel',
config: {
  title: 'Generic version',
  html: 'This is the main screen'
}
});
```

While this is just a simple example, it can be seen that when the device profile loader loads Mail.profile.Tablet as the active device profile, the title property is specialized by the Mail.view.tablet.Main view as Tablet-specific version. Further, by virtue of the Mail.view.tablet.Main view sub-classing (extending) the Mail.view.Main view, the Mail.view.tablet.Main view inherits any data and logic specified in the more generic Mail.view.Main view that the Mail.view.tablet.Main view extends, thereby reusing such data and logic without having to duplicate it in the Mail.view.tablet.Main view. Thus, with the device profile loader of the present invention, views can be specialized for different types of computing devices while avoiding unnecessary duplication of client-side scripting instructions.

3.3 the Launch Process

According to some embodiments of the present invention, device profile-based Web applications have a three-stage launch process implemented by the Web application launcher. As discussed above, after all of the models, views, and controllers specified by the application component and the active device profile have been loaded by the device profiler loader, the following is performed by the Web application launcher:

First Stage: The loaded controller components are instantiated and an initialization function of each instantiated controller component is invoked.

Second Stage: A predetermined launch function of the active device profile is invoked, if defined by the active device profile. In one embodiment, this predetermined launch function of the active device profile has the name launch. Other names may be used.

Third Stage: A predetermined launch function of the application component is invoked, if defined by the application component. In one embodiment, this predetermined launch function of the application component has the name launch. Other names may be used A developer may use the active device profile's launch function to create the Web application's initial user interface. In this case, the launch function of the application component may be undefined by the developer because the initial user interface of the Web application is device-profile specific. If the launch function of the active device profile or the application component is undefined, it is not invoked by the Web application launcher during the launch process. However, even where the launch function of the active device profile creates the initial user interface, the launch function of the application component may still be defined by the developer to setup or initialize profile-agnostic Web application features such as, for example, analytics.

For example, a launch function of the active device profile might be defined by a developer as follows:

```
Ext.define('Mail.profile.Phone', {
extend: 'Ext.app.Profile',
config: {
  name: 'Phone',
  views: ['Main']
},
```

```
isActive: function( ) {
    return Ext.os.is.Phone;
},
launch: function( ) {
    Ext.create('Mail.view.phone.Main');
}
});
```

Here, the device profile's launch function, when invoked by the Web application launcher, instantiates (creates) the Mail.view.phone.Main view. However, if the launch function had not been defined by the developer or the device profile is not the active device profile on the target computing device then it would not be invoked by the Web application launcher during the second stage of the launch process.

3.4 Deep Link Router

With the deep link router of the present invention, a Web application implemented in a client-side scripting language can provide deep linking and Web browser history support to users. For example, a user can invoke the back button functionality of the Web browser to navigate between user interface states of the Web application without having to refresh the entire Web page. Further, a user can send a deep link to a user interface state of the Web application to another user and that other user can navigate directly to that user interface state using the deep link. As a result, with the deep link router of the present invention, a developer can develop a Web application that functions as a user might expect.

3.4.1 Setting Up Deep Link Routes

According to one embodiment of the present invention, deep link routes are specified by controllers of the Web application and registered with the deep link router. Generally, a deep link route is a mapping between a set of one or more URLs and a method of a controller. The deep link router registers with the Web browser to receive notification of DOM events corresponding to the entry of a URL in the address bar of the Web browser, the invocation of the Web browser back button, and invocation of any similar Web browser functionality for loading a Web page at a given URL. When a set of deep link routes is registered with the deep link router, the deep link router adds the set of deep link routes to a callback table maintained by the deep link router. When the deep link router receives a DOM event having a target URL, the deep link router consults the callback table based on the target URL to determine which controller method to invoke, if any. If there is no method to invoke for the target URL according to the callback table, then the deep link router may indicate to the Web browser (e.g., by return value) that it did not handle the DOM event. By doing so, other downstream DOM event handlers (e.g., the Web browser itself) will have an opportunity to handle the DOM event that was not handled by the deep link router.

According to some embodiments of the present invention, a deep link route specified by a controller may include special route variable syntax that the deep link router uses to extract string tokens from a target URL. The deep link router then passes the extracted string tokens as parameters to the arguments of the controller method specified in the deep link route. For example, the following is example of controller that specifies a deep link route using the ':' (colon) character to indicate the route variable id:

```
Ext.define('MyApp.controller.Products', {
    extend: 'Ext.app.Controller',
    config: {
        routes: {
            'products/:id': 'showProduct'
        }
    },
    showProduct: function(id) {
        console.log('showing product'+id);
    }
});
```

The ':' character in the above deep link router indicates to the deep link router that the following id token should be treated as a variable such that the route matches any target URL containing the fragment #products/[id token] where [id token] is any valid fragment path character sequence. When such a target URL is received, the deep link router parses the [id token] from the target URL and passes the [id token] as a parameter for the id argument of the showProduct function. For example, the target URLs #products/123, #products/456, and #products/abc would each result in the deep link router invoking the showProduct method passing the strings 123, 456, and abc as the parameter for the id argument respectively. In one non-limiting embodiment, a valid fragment path character sequence is any valid pchar sequence as defined in RFC 3986.

A controller may also register multiple routes as in the following example:

```
Ext.define('MyApp.controller.Products', {
    extend: 'Ext.app.Controller',
    config: {
        routes: {
            'products/:id': 'showProduct',
            'products/:id/:format': 'showProductInFormat'
        }
    },
    showProduct: function(id) {
        console.log('showing product'+id);
    },
    showProductInFormat: function(id, format) {
        console.log('showing product'+id+'in'+format+'format');
    }
});
```

In this example, the second route matches target URLs containing a relative URL like #products/123/pdf, for example. In one embodiment, where the controller method specified in a route accepts multiple arguments as does the showProductInFormat above, the tokens parsed from a matching target URL are passed to the controller method in the order specified in the route. For example, for the second route above, the token matching the route variable :id is passed as the id argument of the showProductInFormat function and the token matching the route variable :format is passed as the format argument. In this case, although the names match in the example above, the name of the route variable in the route does not need to match the name of the argument of the controller method. In another embodiment, the deep link router uses the name of the route variable to determine which argument of a multi-argument controller method that the token bound to the route variable should be passed as. In this embodiment, the order of the route variables in the route does not need to correspond to the order of the arguments of the controller method.

3.4.2 Deep Linking Across Device Profiles

The device profile and deep linking techniques of the present invention can be used together in a Web application such that one user using the Web application on one type of device can share a deep link with another user using the Web application on another type of device. The other user can use the deep link to navigate directly to a specific user interface state on the device he or she is using even if that deep link corresponds to a different user interface state on the sharer's device. To achieve this, the developer may author device profile-specific controllers that are loaded accordingly by the device profile loader of the present invention depending on which device profile is the active device profile. The device profile-specific controllers may each sub-class a super-class controller such as:

```
Ext.define('MyApp.controller.Products', {
    extend: 'Ext.app.Controller',
    config: {
        routes: {
            'products/:id': 'showProduct'
        }
    }
});
```

A phone-specific controller may sub-class the MyApp.controller.Products controller and implement the showProduct method as follows:

```
Ext.define('MyApp.controller.phone.Products', {
    extend: 'MyApp.controller.Products',
    showProduct: function(id) {
        console.log('showing a phone-specific Product page for'+id);
    }
});
```

Similarly, a tablet-specific controller may sub-class the MyApp.controller.Products controller and implement the showProduct method as follows:

```
Ext.define('MyApp.controller.tablet.Products', {
    extend: 'MyApp.controller.Products',
    showProduct: function(id) {
        console.log('showing a tablet-specific Product page for'+id);
    }
});
```

As a result, if a deep link URL containing the fragment, for example, #products/123 is shared by a user on a phone computing device with a user on a tablet computing device, the deep linker router on the tablet computing device will appropriately route the shared deep link URL to the showProduct function of the MyApp.controller.tablet.Products controller.

4.0 Summary of Operation 4.1 Device Profile Loader

Figure 4:
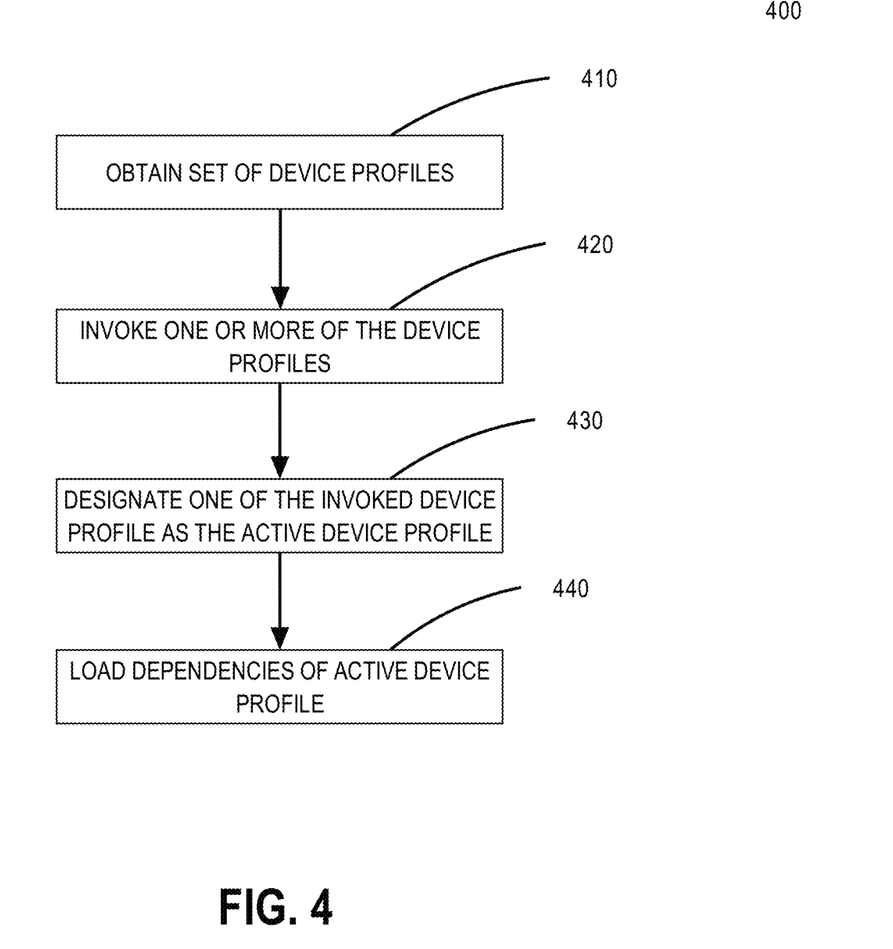
FIG. 4 is a flow diagram showing the operation of the device profile loader after a Web application begins execution on a target computing device, according to an embodiment of the present invention.

FIG. 4 is a flow diagram showing the operation of the device profile loader after a Web application begins execution on a target computing device, according to an embodiment of the present invention.

In step 410, the device profile loader obtains a set of device profiles. The obtained set may include fully-qualified or shortened device profile component names. The device profile loader may use these names to construct file system pathnames to files containing definitions of the device profiles. The file system pathnames may be constructed by the device profile loader according to predetermined convention. Once a file system pathname is constructed, to obtain the device profile defined in the file, the device profile loader may open the file and evaluate (execute) the contents of the file to make the logic and data of the device profile component definition available to the executing Web application. As an alternative to fully-qualified or shortened device profile component names, the obtained set of device profiles may contain references or pointers to the device profiles themselves. The device profile loader may obtain the set of device profiles by invoking or dereferencing an interface of an existing runtime component such as, for example, the profiles property of an application component as in some of the previously described examples. As an alternative to dereferencing a property of an existing component to obtain the set of device profiles, the device profile loader may invoke a function of an existing component that returns or provides the set of device profiles as output.

In step 420, the device profile loader invokes an interface of each of one or more of the device profiles obtained in step 410. The interfaces may invoked by the device profile loader in parallel or one at a time in a series. The purpose of invoking the interfaces is to determine which of the device profiles is to be the active device profile on the target computing device. In one embodiment, the interface of a device profile includes a method with a predetermined name (e.g., isActive) that returns a Boolean value indicating whether that device profile should be the active one on the target computing device. However, other types of interfaces are possible. For example, the interface may return a confidence score or some other metric which the device profile loader uses to select one of the device profiles.

In step 430, based on results of the invocations in step 420, one of the device profiles obtained in step 410 is designated by the device profile loader as the active device profile for the target computing device.

In step 440, the device profile loader loads dependencies specified by the active device profile. These dependencies may include any models, views, and controllers specified by the active device profile. The device profile loader may load dependencies similar to the manner in which device profiles are loaded by the device profile loader. Accordingly, dependencies may be specified by the active device profile according to fully-qualified or shortened component names, in which case the device profile loader will construct file system pathnames according to a convention and evaluate (execute) client-side scripting language instructions contained in the files at the constructed file pathnames to make the dependencies available to the rest of the executing Web application. Alternatively, the active device profile may specify dependencies with references to the previously-loaded components themselves, in which case constructing file pathnames would not be necessary.

4.2 Web Application Launcher

Figure 5:
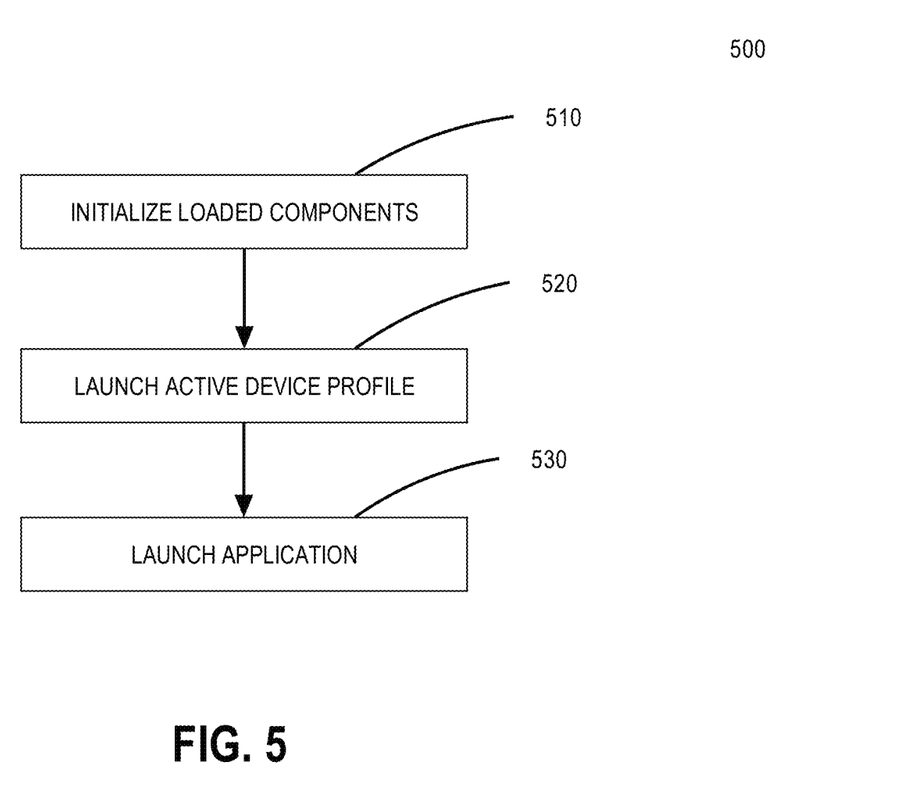
FIG. 5 is a flow diagram showing the operation of the Web application launcher after the device profile loader has loaded an active device profile on the target computing device, according to an embodiment of the present invention.

FIG. 5 is a flow diagram showing the operation of the Web application launcher after the device profile loader has loaded the active device profile on the target computing device, according to an embodiment of the present invention.

In step 510, the Web application launcher invokes an interface of each of the controllers loaded by the device profile loader to initialize the loaded controllers. This set of controllers may include any controllers specified as dependencies of the application component (or more generally, any controllers that are not device profile-specific) as well as any controllers specified as dependencies of the active device profile. The order of initialization may be to initialize all controllers depended upon by the application component before any controllers of the active device profile are initialized. The interface may be a method of the controller having a predetermined name such as init, for example. However, no particular name is required of the invention. In another embodiment, the Web application launcher invokes previously registered callback functions of the loaded controllers to initialize them.

In step 520, the active device profile is launched thereby providing an opportunity to setup and initialize an initial device-specific user interface by, for example, creating a device-specific view component. The Web application launcher may launch the active device profile by invoking a method of the active device profile with a predetermined name such as launch, for example. However, no particular name is required of the invention. In another embodiment, the Web application launcher invokes a previously registered callback method of the active device profile to launch the active device profile.

In step 520, the Web application launcher launches the application component by invoking a method on the application component with a predetermined name such as launch, for example. However, no particular name is required of the invention. In another embodiment, the Web application launcher invokes a previously registered callback method of the application component to launch the application component.

4.3 Deep Link Router

Figure 6:
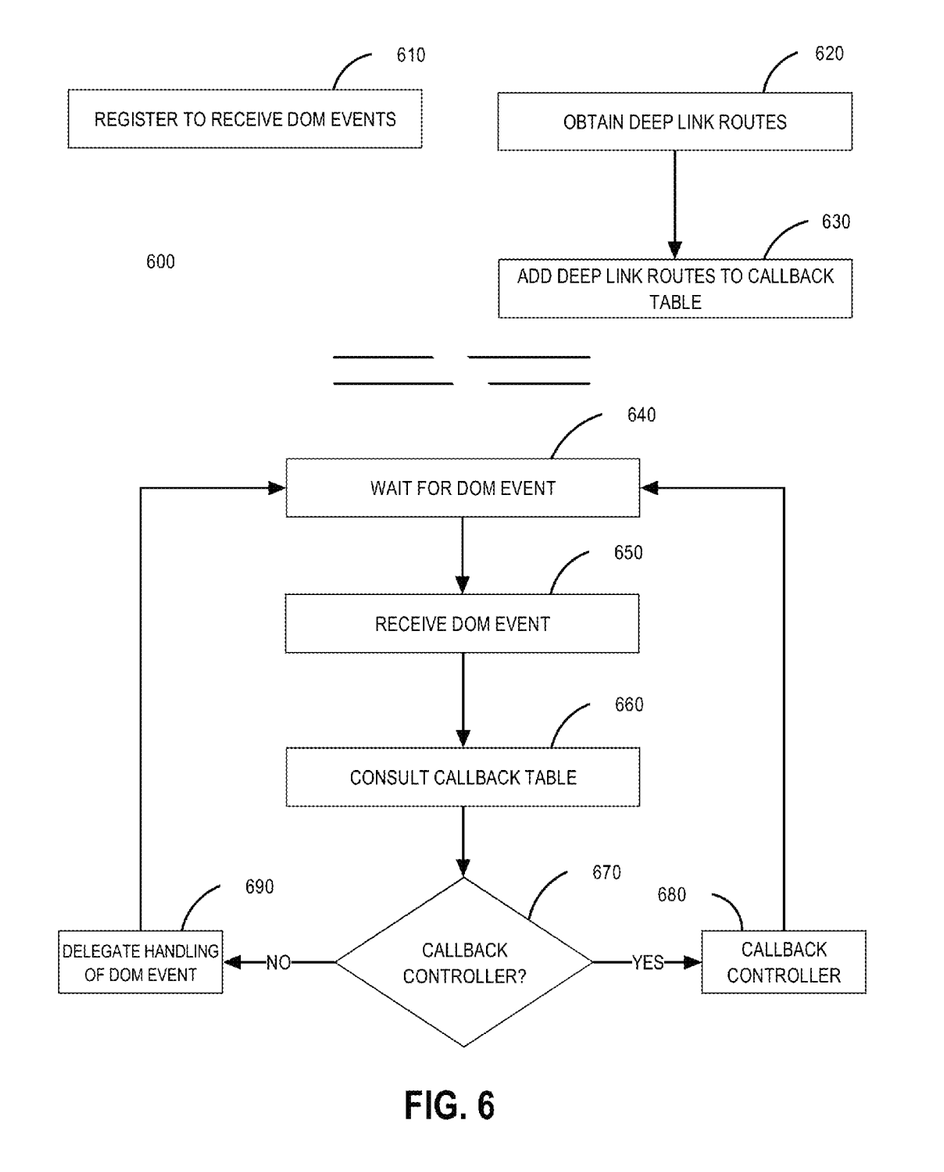
FIG. 6 is a flow diagram showing the operation of the deep link router of the present invention after the Web application launcher has launched the Web application on the target computing device, according to an embodiment of the present invention.

FIG. 6 is a flow diagram showing the operation of the deep link router of the present invention after the Web application launcher has launched the Web application on the target computing device, according to an embodiment of the present invention.

In step 610, the deep link router registers with a Web browser to receive notifications of DOM events. The deep link router may register to receive the notifications using an interface (e.g., an API) provided by the Web browser. For example, the deep link router may register a callback function with the Web browser that the Web browser invokes when it has a DOM event of interest. Depending on the capabilities of the interface provided by the Web browser, the deep link router may register to receive notification of just DOM events corresponding to when a URL is entered into the address bar of the Web browser, the Web browser's back button feature is invoked, or, more generally, whenever the Web browser is commanded to load a web page at a given URL. In this case, upon being notified of a DOM event, the deep link router may assume the DOM event corresponds to a deep linking request. However, the deep link router may instead register to receive notification of an over-inclusive set of DOM events. In this case, the deep link router may initially inspect the DOM event to determine whether it corresponds to a deep linking request or another type of event (e.g., resizing of a Web page window) before handling the DOM event.

Steps 620 and 630 can be performed by the deep link router concurrently with, before, or after step 610. In step 620, the deep link router obtains deep link routes specified by the loaded controllers of the Web application. Such obtaining may be active or passive. That is, the deep link router can actively obtain the deep link routes by invoking or dereferencing an interference of the loaded controllers. Alternatively, the deep link router can be provided the deep link routes by the loaded components or another component or components of the Web application.

An obtained deep link route may include a URL pattern string and a specification of a controller method to invoke if a target URL (i.e., deep link) received in a DOM event satisfies the URL pattern string. In step 630, the deep link router adds the deep link routes obtained in step 610 to a callback table. The deep link router uses the callback table in response to receiving a target URL in a DOM event to determine which controller method, if any, should be invoked to handle the deep link. Conceptually, the callback table maps deep links to controller methods. While the term "table" is used to describe the callback table, it should be understood that the deep link router may actually implement the callback table using a data structure other than a table data structure. For example, the callback table may actually be a tree data structure, hashing data structure, or a combination of a tree and hashing data structure, as examples.

Once the deep link router has completed steps 610, 620, and 630 it is ready to receive and handle DOM events. In step 640, the deep link router 640 waits to receive notification of a DOM event from the Web browser. In step 650, a DOM event corresponding to a deep linking request is received. The DOM event indicates a deep link URL of the deep linking request.

In step 660, the deep link router consults the callback table to determine whether a controller method should be invoked. In one embodiment, before consulting the callback table, the deep link router identifies the relative reference portion (or a portion thereof) of the deep link URL and then consults the callback table with the relative reference portion (or the portion thereof) to determine whether a controller method should be invoked. For example, the deep link router may identify the URL fragment (the portion of the URL after a number sign '#' character) of an absolute URL and consult the callback table with the URL fragment instead of the entire absolute URL. What portion of the deep link URL that the deep link router consults the callback table with may depend on how controllers specify deep link routes to the deep link router. For example, if the URL patterns of deep link routes specified by controllers are based on the URL fragment portion of the deep link URLs (as in the examples above), then the deep link router may consult the callback table with URL fragment portions of received deep link URLs. However, it should be understood that deep link router of the present invention is not limited to consulting the callback table with only the relative reference portion (or a particular portion thereof) of a deep link URL.

In step 670, based on the results of consulting the callback table, the deep link router determines whether a method of a controller should be invoked. If a method of a controller is to be invoked, then the deep link router invokes the method at step 680. This may involve parsing string tokens from the deep link URL and passing the string tokens as arguments to the invoked method depending on whether the URL pattern of the corresponding deep link route included variable tokens. On the other hand, if a method a controller is not to be invoked, then the deep link router at step 690 delegates handling of the DOM event received at step 650. This delegation may involve messaging the Web browser that the DOM event was not handled, for example, by a return value from the callback function invoked by the Web browser.

After the DOM event received at step 650 has been handled at step 680 or delegated at step 690, the deep link router returns to step 640 to wait for the next DOM event.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method, comprising:
at a computing device, during an execution of a client-side web application, the client-side web application having a plurality of device profiles, each device profile of the plurality of device profiles specifying one or more models, one or more views, and one or more controllers of that device profile:
  querying at least one device profile, of the plurality of device profiles, to determine an active device profile, of the plurality of device profiles, on the computing device;
  wherein querying the at least one device profile includes receiving, from the at least one device profile, an indication whether the computing device is supported by the at least one device profile; and
  loading the one or more models, the one or more views, and the one or more controllers of the active device profile;
  wherein, during the execution of the client-side web application, at least one model of the one or more models, at least one view of the one or more views, or at least one controller of the one or more controllers of a device profile, of the plurality of devices profiles, is not loaded.

2. The method of claim 1, wherein querying the at least one device profile includes invoking a predefined method of the at least one device profile.

3. The method of claim 1, wherein loading the one or more models, the one or more views, and the one or more controllers of the active device profile includes:
  constructing one or more file system pathnames to one or more files containing client-side scripting language instructions implementing the one or more models, the one or more views, and the one or more controllers; and
  evaluating the client-side scripting language instructions contained in the one more files.

4. The method of claim 1, wherein querying at least one device profile, of the plurality of device profiles, to determine an active device profile, of the plurality of device profiles, on the computing device includes querying less than all of the plurality of device profiles before the active device profile is determined.

5. The method of claim 1, wherein each device profile of the plurality of device profiles specifies one or more models, one or more views, and one or more controllers of that device profile by one or more properties of that device profile.

6. The method of claim 1, further comprising:
  obtaining, from at least one controller of the active device profile, a list of one or more routes, each route, in the list, specifying a match pattern and a name of a callable function of the at least one controller;
  receiving a Uniform Resource Locator (URL);
  in response to receiving the URL, determining whether a match pattern of a route in the list of one or more routes matches the URL; and
  in response to determining that a match pattern of a particular route in the list of one or more routes matches the URL, invoking the callable function named by the particular route.

7. The method of claim 1, wherein the at least one device profile of the client-side web application is implemented by a client-side scripting language selected from the group consisting of ECMAScript, JavaScript, ActionScript, or Jscript.

8. One or more non-transitory computer-readable storage media storing instructions which, when executed by one or more processors, cause performance of a method comprising:
  at a computing device, during an execution of a client-side web application, the client-side web application having a plurality of device profiles, each device profile of the plurality of device profiles specifying one or more models, one or more views, and one or more controllers of that device profile:
  querying at least one device profile, of the plurality of device profiles, to determine an active device profile, of the plurality of device profiles, on the computing device;
  wherein querying the at least one device profile includes receiving, from the at least one device profile, an indication whether the computing device is supported by the at least one device profile;
  loading the one or more models, the one or more views, and the one or more controllers of the active device profile;
  wherein, during the execution of the client-side web application, at least one model of the one or more models, at least one view of the one or more views, or at least one controller of the one or more controllers of a device profile, of the plurality of devices profiles, is not loaded.

9. The one or more non-transitory computer-readable storage media of claim 8, wherein querying the at least one device profile includes invoking a predefined method of the at least one device profile.

10. The one or more non-transitory computer-readable storage media of claim 8, wherein loading the one or more models, the one or more views, and the one or more controllers of the active device profile includes:
  constructing one or more file system pathnames to one or more files containing client-side scripting language instructions implementing the one or more models, the one or more views, and the one or more controllers; and
  evaluating the client-side scripting language instructions contained in the one more files.

11. The one or more non-transitory computer-readable storage media of claim 8, wherein querying at least one device profile, of the plurality of device profiles, to determine an active device profile, of the plurality of device profiles, on the computing device includes querying less than all of the plurality of device profiles before the active device profile is determined.

12. The one or more non-transitory computer-readable storage media of claim 8, wherein each device profile of the plurality of device profiles specifies one or more models, one or more views, and one or more controllers of that device profile by one or more properties of that device profile.

13. The one or more non-transitory computer-readable storage media of claim 8, the method further comprising:
  obtaining, from at least one controller of the active device profile, a list of one or more routes, each route, in the list, specifying a match pattern and a name of a callable function of the at least one controller;
  receiving a Uniform Resource Locator (URL);
  in response to receiving the URL, determining whether a match pattern of a route in the list of one or more routes matches the URL; and
  in response to determining that a match pattern of a particular route in the list of one or more routes matches the URL, invoking the callable function named by the particular route.

14. The one or more non-transitory computer-readable storage media of claim 8, wherein the at least one device profile of the client-side web application is implemented by a client-side scripting language selected from the group consisting of ECMAScript, JavaScript, ActionScript, or Jscript.

* * * * *